United States Patent
Taugher (10) Patent No.: US 6,460,093 B1
(45) Date of Patent: *Oct. 1, 2002

(54) AUTOMATIC CONFIGURATION OF PRIMARY AND SECONDARY PERIPHERAL DEVICES FOR A COMPUTER

(75) Inventor: Lawrence N. Taugher, Loveland, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/928,879

(22) Filed: Sep. 12, 1997

(51) Int. Cl.$^7$ ................................................. G06F 3/00
(52) U.S. Cl. ............................ 710/8; 710/10; 711/101; 711/111; 711/166
(58) Field of Search .................... 395/275, 200, 395/378, 651, 284, 828, 838, 830, 200.5, 65, 281–282, 894, 325; 711/211; 364/200; 710/10, 104; 714/25

(56) References Cited

U.S. PATENT DOCUMENTS

| | | | | |
|---|---|---|---|---|
| 4,360,870 A | * | 11/1982 | McVey | 395/829 |
| 4,373,181 A | * | 2/1983 | Chisholm et al. | 711/211 |
| 4,775,930 A | * | 10/1988 | Clawson et al. | 714/25 |
| 4,837,680 A | * | 6/1989 | Crockett et al. | 395/284 |
| 5,014,193 A | * | 5/1991 | Garner et al. | 710/10 |

(List continued on next page.)

FOREIGN PATENT DOCUMENTS

| | | |
|---|---|---|
| EP | 0629098 A2 | 12/1994 |
| EP | 0778532 A2 | 11/1997 |
| JP | 07160378 | 6/1995 |

OTHER PUBLICATIONS

Levy–Abegnoli: "Plug and Play: Une Philosophie de Conception des PC" Electronique., No. 37, Apr. 1994, pp. 36–39 No Translation.

Pending U.S. Application entitled, "Automatic Configuration Of Primary And Secondary Peripheral Devices for A Computer", U.S. Ser. No. 09/033,234, Filed Mar. 2, 1998. Inventor: Firooz, et al.(HP Docket No. 10980044–1).

Pending U.S. Application entitled, "Automatic Configuration of Primary and Secondary Peripheral Devices For A Computer", U.S. Ser. No. 09/240,293 Filed Jan. 29, 1999. Inventor: Firooz, et al. (HP Docket No. 10980718–1).

Primary Examiner—Reba I. Elmore
(74) Attorney, Agent, or Firm—Augustus W. Winfield (57) ABSTRACT

A method of automatically configuring a computer peripheral device as a primary device or as a secondary device. There are four possible cases: (1) no other device present, (2) legacy primary device present, (3) legacy secondary device present and (4) second unconfigured jumperless device present. In each example embodiment, the host computer determines whether any legacy devices are present by sending commands that are ignored by unconfigured jumperless devices. If a legacy device is present, the host computer sends a command recognized only by an unconfigured jumperless device commanding the particular configuration for the jumperless device. In a first example embodiment, jumperless devices assert a signal after reset with a timing that is dependent on an electronically readable identification on the device. For case (4), the first device to assert the signal becomes the secondary device. For case (4) in the second example embodiment, each jumperless device drives or monitors a line during sequential time periods corresponding to bits in the electronically readable identification number. For case (4) in the third example embodiment, the jumperless devices arbitrate for primary/secondary status without involvement by the host computer by a process that is dependent on the electronically readable identification number on each device.

4 Claims, 4 Drawing Sheets

U.S. PATENT DOCUMENTS

| | | | |
|---|---|---|---|
| 5,247,682 A | | 9/1993 | Kondou et al. .......... 364/280.2 |
| 5,313,595 A | * | 5/1994 | Lewis et al. ................. 395/325 |
| 5,428,748 A | * | 6/1995 | Davidson et al. ........... 395/829 |
| 5,519,882 A | * | 5/1996 | Asano et al. ................. 710/10 |
| 5,553,245 A | * | 9/1996 | Su et al. ...................... 710/104 |
| 5,649,233 A | | 7/1997 | Chen ............................. 710/8 |
| 5,689,726 A | * | 11/1997 | Lin ............................. 395/830 |
| 5,745,557 A | | 4/1998 | Anglikowski ................ 379/177 |
| 5,761,460 A | * | 6/1998 | Santos et al. ................ 710/129 |
| 5,848,294 A | | 12/1998 | Clark ........................... 395/856 |
| 5,852,743 A | * | 12/1998 | Yeh .............................. 395/838 |
| 5,862,375 A | * | 1/1999 | Gephardt ..................... 395/651 |
| 5,867,730 A | * | 2/1999 | Leyda ......................... 395/830 |
| 6,145,019 A | * | 11/2000 | Firooz et al. ................ 379/177 |

* cited by examiner

AUTOMATIC CONFIGURATION OF PRIMARY AND SECONDARY PERIPHERAL DEVICES FOR A COMPUTER

FIELD OF INVENTION

This invention relates generally to computer mass memory and more specifically to automatic configuration of primary and secondary devices for personal computers.

BACKGROUND OF THE INVENTION

For personal computers using Intel compatible microprocessors, peripheral devices (for example, magnetic disk drives, compact disk drives, tape drives, and some devices other than mass memory devices) commonly use an industry specified bus interface called AT Attachment (ATA). The computer systems support up to two ATA host adapters (which may be combined on a single printed circuit board), each of which can support up to two peripheral devices. For each host adapter, there may be one primary device (or "master" or device 0) and one secondary device (or "slave" or device 1). In addition, device electronics for a primary device may need to be aware of whether there is a secondary device present. Typically, a set of small removable 2-pin connectors (called jumpers) on each device determine, among other things, whether the device is a primary or secondary device, and if primary whether there is a secondary device present. Jumper configurations are not standard, they are typically poorly labeled, and they are typically difficult to access without removing a device. Confusion over jumper requirements has led to a great deal of customer frustration and numerous phone calls to customer service organizations.

Personal computer peripheral devices commonly integrate most of the input/output (I/O) electronics along with the device electronics, using industry specifications called Integrated Drive Electronics (IDE). IDE devices may be designed for many different host computer bus systems, including ATA. For Intel compatible personal computers, cabling specifications and signal definitions may be referred to as ATA specifications or IDE specifications, depending on the manufacturer. For Intel compatible personal computers, the most common ATA/IDE mass memory interface cable is a 40-conductor ribbon cable. Connector pin/socket 39 provides a signal called Drive Active/Slave Present (DASP). DASP drivers are implemented as open-collector drivers on the ATA devices. DASP is asserted by driving the line low. DASP is a time multiplexed signal that may be asserted by either device. The signal is used during a power-up/reset initialization phase to indicate that a secondary (slave) device is present, and is used later to indicate device activity. During power-on initialization, if a secondary device is present, the secondary device asserts DASP within 400 milliseconds of power-on. If no secondary device is present, the primary device may assert DASP after a delay of 450 milliseconds after power-on. If a secondary device is present, the secondary device deasserts DASP following the receipt of a valid command or after the secondary device is ready, or after 31 seconds, whichever comes first. Once DASP is deasserted, either device can assert DASP to light a device-activity light emitting diode (LED). If a secondary device is not present, the primary device is then automatically further configured as a primary device with no secondary device present and the primary device then responds to commands sent to a secondary device. If a secondary device asserts DASP within the proper time window, the primary device is automatically further configured as a primary device with a secondary device present and the primary device then does not respond to commands sent to the secondary device. There is no general standard for a provision for a host computer to be able to command a primary device to change its configuration. That is, once a primary device configures itself as "with secondary" or "without secondary" there is no general standard way to override that autoconfiguration.

One industry effort to eliminate the need for configuration jumpers for determination of primary/secondary device status is included in an industry specification called Plug and Play ATA. In Plug and Play ATA, primary/secondary device status is determined by which one of two cable connectors is attached to a device. Plug and Play ATA dedicates one wire of a standard interface cable to a signal called Cable Select. The Cable Select line is grounded by the host computer. In the interface cable, the Cable Select line connects to its corresponding socket in the connector for a primary device, and does not connect to its corresponding socket in the connector for a secondary device. If a device connected to the interface cable detects that the Cable Select line is grounded, the device configures itself to be a primary device, and if the device does not detect a ground potential on the Cable Select line the device configures itself to be a secondary device.

Automatic address determination is also a problem for the I/O boards on the I/O bus of the host computer. For Intel compatible computers, one industry specification for automatically configuring I/O boards for the ISA bus is called the Plug and Play ISA Standards. For ISA Plug and Play, each compatible I/O card has a unique identifier that includes a vendor identifier and a serial number. Each compatible I/O card can read its own identifier. The host computer first places all the cards into a configuration mode. Then the host computer drives a line with a series of transitions indicating sequential bit positions within each identifier. At the end of each series, at most only one I/O card remains active. The sequence of bits from the host computer logically progresses from least-significant-bit to mostsignificant-bit for the identifiers. At each bit position in the sequence, each compatible I/O card determines whether its identifier has a logical one in the same bit position. If the I/O card identifier has a logical one in the same position, the I/O card drives the bus to a particular value. If at any bit position in the sequence an I/O card identifier has a logical zero at the bit position, the I/O card does not drive the bus, and determines whether any other card is driving the bus to the particular value. If at any bit position in the sequence an I/O card identifier has a logical zero at the bit position and another card is driving the bus to the particular value, the I/O card having a logical zero at the bit position ceases to participate in the remainder of the sequence. At the end of all the bit positions for an identifier, one card remains. This card is assigned a logical device number by the host. The sequence is then repeated to isolate another card and so forth until all cards have been assigned a logical device number.

Another common interface standard for ATA devices is the Small Computer System Interface (SCSI). SCSI also requires a unique ID for each device. An industry group has proposed a set of specifications, called Plug and Play SCSI, which among other things provides automatic assignment of unique SCSI IDs. The particular protocol for assignment of unique IDs is called SCSI Configured AutoMagically (SCAM). Each SCAM compatible device has a default ID saved in a non-volatile device memory. A SCAM master device first commands each of the other SCAM devices, one at a time, to go into an inactive state. Then, the master device uses a protocol similar to the protocol for ISA Plug and Play to isolate each device for assignment of a SCSI address.

Plug and Play ATA substantially improves ease of use when it is implemented for new systems. However, many new devices need to be installed into systems that predate the Plug and Play ATA specifications. In addition, Plug and Play ATA is not a universally adopted standard, so that devices installed into some new systems still may require jumper configuration.

There is a need for further improvement for automatic determination of primary/secondary device status when a new device is installed, particularly for devices being installed into older or non-standard systems.

SUMMARY OF THE INVENTION

Multiple methods of autoconfiguration are provided in which a jumperless device can be automatically configured as primary or secondary when installed into a system. For each example embodiment, there are four possible cases: (1) no other device present, (2) legacy primary device present, (3) legacy secondary device present and (4) unconfigured jumperless device present.

In each embodiment, the host computer interrogates the devices to determine whether a legacy device or configured jumperless device is present. An unconfigured jumperless device does not respond to the host commands. If there is a legacy or configured jumperless device present, the host computer then tells an unconfigured jumperless device its proper configuration.

In the first example embodiment, a jumperless device first waits to see if a legacy secondary device is present. If a secondary device is present, the jumperless device configures itself as a primary device with a secondary device present. If there are two unconfigured jumperless devices, which one becomes primary depends on a relative timing at start-up determined by an electronically readable identification number on each device. If there is no secondary legacy device present, the host computer commands the device configuration for the unconfigured jumperless device(s) after determining whether there is a primary (legacy or newly configured jumperless) device present.

In a second example embodiment, if there are two unconfigured jumperless devices, the host computer transmits or initiates a series of bit positions corresponding to bit positions within device identification numbers. An unconfigured jumperless device asserts DASP if the unconfigured jumperless device has a logical "one" at the bit position. If a first device detects the presence of another device, the first device configures itself as a primary device with a secondary device present. When all bit positions have been tested, there will be one unconfigured jumperless device remaining. The host sends a command to a primary (legacy or newly configured jumperless) device. If no device responds, the one unconfigured device is commanded to configure itself as a primary device with no secondary device present. Otherwise, the one unconfigured device is commanded to configure itself as a secondary device.

In a third example embodiment, if there is no legacy device present, the jumperless device goes through an arbitration sequence to determine the primary device, dependent on an electronically readable identification number on each device.

DETAILED DESCRIPTION OF THE PREFERRED EMBODIMENT OF THE INVENTION

In each of the following example embodiments of the invention, a device having jumperless specifications in accordance with the invention is referred to as a jumperless device. A jumperless device is initially unconfigured, neither a primary device or a secondary device. A device not conforming to the jumperless specifications is referred to as a legacy device. Note that a device conforming to Plug and Play ATA is a legacy device. In each embodiment, a jumperless device is being added to an ATA/IDE system. There may or may not be another device already present. There are four possible cases as follows: (1) no other device present, (2) legacy primary device present, (3) legacy secondary device present and (4) another unconfigured jumperless device present.

The present invention is primarily concerned with electronic device identification at the peripheral device hardware level and host software driver level. Independent of hardware identification and driver identification, host operating system software may have a separate identification for peripheral devices. For example, for mass memory devices, the host operating system may refer to the devices as Drive C or Drive D and so forth.

For jumperless devices in accordance with the invention, there are two alternatives for action after installation. In one alternative, once a jumperless device is configured, the jumperless device retains its configuration in a non-volatile memory. A configured jumperless device is then effectively a legacy device. Note that the first alternative is consistent with the configuration philosophy of Plug and Play ATA, in which the customer is expected to explicitly take action to change configuration. In a second alternative, all devices reconfigure every time there is a power-on/reset event. In each of the following embodiments, jumperless devices have a unique identification number in an electronic form readable by the device controller electronics. The identification number may, for example, comprise an assigned unique manufacturer number plus a factory determined serial number for the device. In the second alternative (configuration not saved), even though devices reconfigure every time there is a power-on/reset event, they will always configure the same way. Therefore, for any particular pair of devices, the configuration will stay constant until a device is removed or added. Note that the second alternative is consistent with the configuration philosophy of Plug and Play SCSI, in which device configuration is completely automatic, and may automatically change when a device is deleted or added.

Typically, at power-on/reset, personal computers load an operating system from a mass memory peripheral device called a boot device. For industry compatibility, if a jumperless device is to be used as a boot device, a jumper is required to enable boot capability and autoconfiguration is not applicable. In addition, because of a lack of rigid industry standards, automatic configuration as taught in the present patent document may not work for all systems. Therefore, jumperless devices may still have provision for optional jumpers to ensure that configuration is possible in all systems. Preferably, if configuration jumpers are present, the jumpers determine the configuration. A device is "jumperless" only if the optional jumpers are not installed. Specifically, at power-on/reset, a jumperless device should check its jumper block. If a jumper is set, the jumperless device should clear any configuration information in non-volatile memory (if present) and proceed with the initialization process according to the jumper setting. Likewise, as discussed above, if no jumpers are present, and a configuration exists in nonvolatile memory, the jumperless device should proceed with the initialization in accordance with the configuration previously set in non-volatile memory. If no jumpers are present and no configuration exists in non-volatile memory, then the jumperless drive should follow the autoconfiguration procedures discussed below in this patent document.

As discussed above, jumperless devices are initially unconfigured. In each embodiment, host computer driver software commands may be sent to unconfigured devices or to configured devices. An unconfigured device must respond to commands to an unconfigured device only and must not respond to commands to a configured device. Commands to unconfigured devices are designed so that no response or action is expected for a configured device. Once configured, a jumperless device must respond to all commands.

Figure 1:
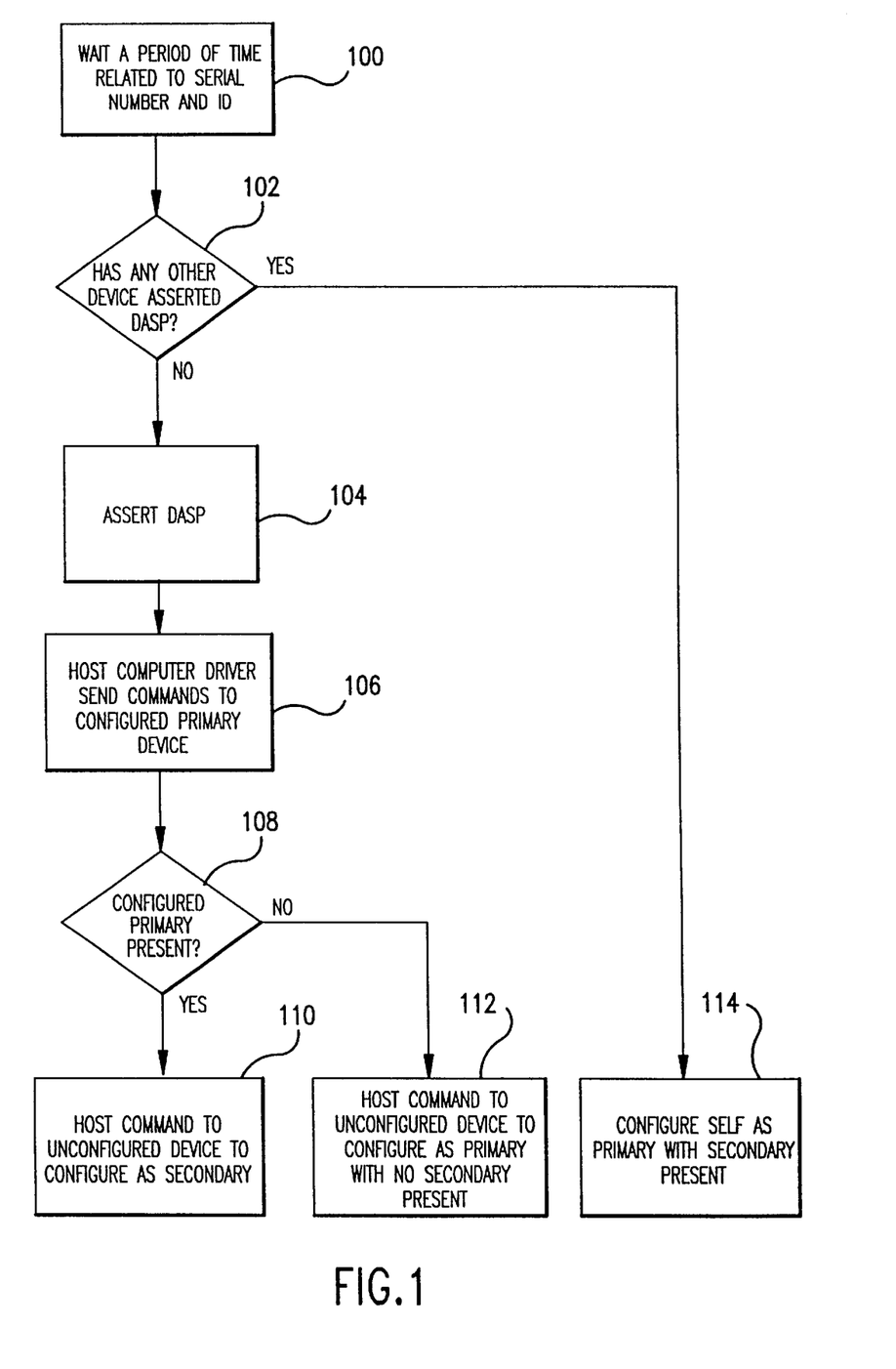
FIG. 1 is a flow chart of a method for autoconfiguration of a device in accordance with a first example embodiment of the invention.

FIG. 1 is a flow chart of an automatic configuration method to be followed by an unconfigured jumperless device in accordance with a first embodiment of the invention. At step 100, the unconfigured jumperless device waits 400 msec plus an -additional amount of time (up to 50 msec) related to its identification number. If a legacy secondary device is present, it will assert DASP within 400 msec. If another unconfigured jumperless device is present, waiting an amount of time related to its identification number ensures that two unconfigured jumperless devices will not simultaneously assert DASP. As an illustration of waiting an amount of time related to identification number, consider a 4-bit ID. The four-bit number may be used to represent milliseconds of delay. Then for example, the device may wait 400 milliseconds plus 0–15 additional milliseconds depending on the four-bit ID number. Preferably, identification numbers are much longer to ensure uniqueness, with longer numbers representing finer increments of delay time.

The unconfigured jumperless device monitors the DASP line, and at decision 102 determines whether any other device has asserted DASP. If another device asserted DASP, the unconfigured jumperless device configures itself as a primary device with a secondary device present (step 114). As will be explained in more detail later, the unconfigured jumperless device also must configure itself to respond to commands directed to configured devices. If after 400 (plus) milliseconds, no other device has asserted DASP, then there is no secondary device present. The unconfigured jumperless device then asserts DASP (step 104). There may or may not be a primary device present (either legacy or configured jumperless). If there is a legacy device present, it will configure itself as a primary device with a secondary device present at step 104 in response to DASP.

Host computer device driver software then sends a series of commands (step 106) that will result in a response from a legacy device or a configured jumperless device, if present. Any host driver activity must occur after the system has completed a boot process, which is typically substantially longer than 450 msec. Unconfigured jumperless devices must not respond to these commands. A newly configured primary jumperless device (from step 114) must respond to these commands. If a primary (legacy or configured jumperless) device responds to the driver commands (decision 108), then the host computer driver commands the unconfigured jumperless device to configure itself as a secondary device (step 110). If no primary device responds to the driver commands of step 106, the host computer driver commands the unconfigured jumperless device to configure itself as a primary device with no secondary device present.

Consider the method of FIG. 1 along with each of the four possible cases. Case 1, no other device present: no other device asserts DASP (decision 102) so the unconfigured jumperless device asserts DASP (step 104). Then, no primary device responds to the commands addressed to legacy or configured devices (step 106 and decision 108) and the host computer driver software commands the unconfigured jumperless device to configure itself as a primary device with no secondary device present (step 112) and to configure itself to respond in the future to all commands. Case 2, legacy primary device present: no other device asserts DASP (decision 102) so the unconfigured jumperless device asserts DASP (step 104). Upon detecting DASP, the legacy primary device configures itself as a primary device with a secondary device present. Then, in this case the legacy primary device does respond to the commands addressed to a primary device (step 106 and decision 108) and the unconfigured jumperless device is commanded to configure itself as a secondary device (step 110) and also to configure itself to respond to all commands in the future. Case 3, legacy secondary device present: the legacy secondary device asserts DASP (decision 102) and the unconfigured jumperless device configures itself as a primary device with a secondary device present (step 114). In addition, the unconfigured jumperless device configures itself to respond all commands in the future. Case 4, jumperless device present: recall that case 4 applies only when 2 unconfigured jumperless devices are installed at the same time or when 2 jumperless devices are present for which configuration information is not stored in non-volatile memory. If a jumperless device has been previously installed and if the device saved its configuration in non-volatile memory, then one of the other cases applies. With two unconfigured jumperless devices, the primary/secondary determination becomes a matter of timing. Depending on the timing dependent on the identification number (step 100) for each of the devices, one of the two devices will assert DASP. The other device will detect the assertion of DASP (decision 102) and configure itself as a primary device with a secondary device present (step 114) and configure itself to respond to all commands. The newly configured primary jumperless device will then effectively be a legacy primary device. The newly configured primary device will then respond to the commands of step 106. The unconfigured device that asserted DASP will then be commanded by the host computer driver to configure itself as a secondary device (step 110) and to respond to all commands in the future.

An example of a suitable series of commands for step 106 is as follows. As part of the ATA specifications, each device has a drive select register and a status register. In order to read from a specific device, the host driver sends a command to set a bit (DRV) in the drive select register of all devices. Then, when a read command is sent, only the device with a configuration consistent with the drive select bit responds. Note from the discussion above that unconfigured jumperless devices must not respond to these commands.

1. Read the contents of the drive select register of the presently selected device (note that at any given time, one device is selected, and at start-up the driver may not know which one is selected) and save the contents.

2. Select the primary device (by sending a command to set the proper bit in the drive select register of all devices), and read the contents of the status register.

3. If the command to read the status register contents results in all hexadecimal F's or invalid data, then no primary device is present, otherwise, a primary device appears to be present.

4. If a primary device appears to be present, send an inquire command. If the series of expected responses is returned, a primary device is present.

5. Select the secondary device (by sending a command to set the proper bit in the drive select register of all devices), and read the contents of the status register.

6. If the command to read the status register contents results in all hexadecimal F's or invalid data, then no secondary device is present, otherwise, a secondary device appears to be present.

7. If a secondary device appears to be present, send an inquire command. If the series of expected responses is returned, a secondary device is present.

8. Restore the drive select register contents saved in step 1.

As an example of a command to cause jumperless devices to assume a specific configuration, there is a SET FEATURES command (opcode EFh) with various subcodes. Subcodes A1h, A2h and A3h are undefined in the current ATA specification. These subcodes may be used to configure an unconfigured jumperless device. When these subcodes are used, an unconfigured jumperless device will ignore the drive select bit and respond to the subcodes as follows. Subcode A1h may be used for a primary device with no secondary device present (step 112), subcode A2h for a primary device with a secondary device present (not used in FIG. 1), and subcode A3h for a secondary device (step 110).

Figure 2A:
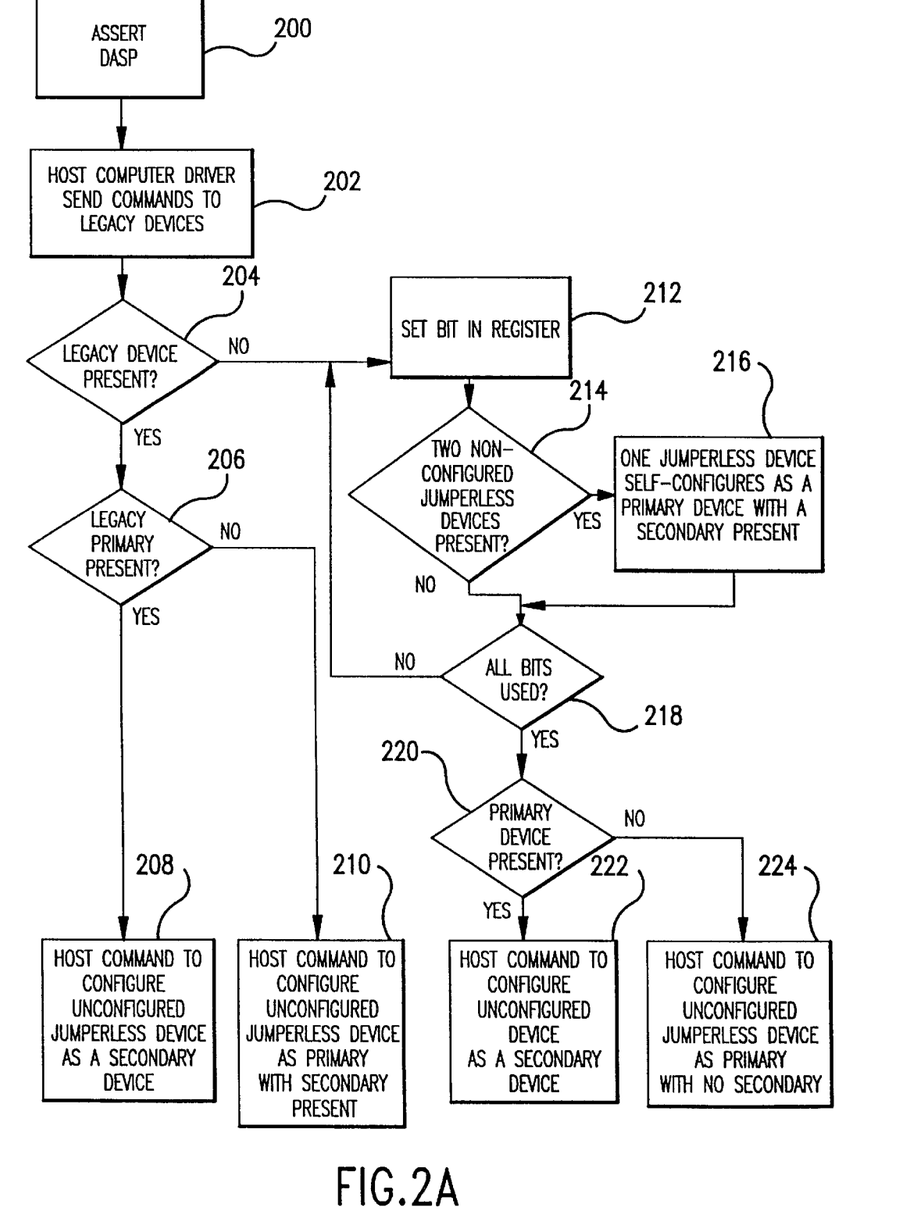
FIG. 2A is a flow chart of a method for autoconfiguration of a device in accordance with a second example embodiment of the invention.

FIG. 2A is a flow chart of an automatic configuration method to be followed by an unconfigured jumperless device in accordance with a second example embodiment of the invention. As in FIG. 1, each jumperless device is initially unconfigured but an unconfigured jumperless device asserts DASP within 400 msec of power-on/reset (step 200) as if configured as a secondary device. If a legacy primary device is present, step 200 ensures that the legacy primary device configures itself as a primary device with a secondary device present. Then, the next step (step 202) uses the same host driver commands as FIG. 1, step 106 to determine whether there is a legacy device present. If there is a legacy device present, the host computer driver software commands the jumperless device configurations (steps 206, 208, 210) just as in FIG. 1, steps 108, 110 and 112.

If there are no legacy devices present (decision 204) the host computer then executes a protocol similar to ISA Plug and Play and SCAM to determine if there are any jumperless devices present, and if so, how to configure them. Alternatively, jumperless devices may execute the protocol without host computer involvement. Each jumperless device is required to have a factory determined identification number that can be electronically read by the device controller electronics. The device identification number has N bits. For each of N possible bits of a device identification number, the host computer may send a command, or place a number in a register, or otherwise signal one bit position in a manner that is detectable by each device (step 212). Alternatively, given a synchronized start time, each unconfigured jumperless device may toggle a signal line (for example, PDIAG, Passed DIAGnostics) with each high to low transition indicating a switch to the next bit position. For example of computer control, the host computer may write a number in a register with the binary number corresponding to a bit position number. Alternatively, using the ATA specifications, the SET FEATURES command may be used with still another unused opcode, for example, A0h. The host computer driver may then write the bits corresponding to bit locations of the device identification number into various available registers. For example, the ATA specifications include a set of 12 registers called The Command Block Registers that are used for sending commands to a device. These registers can be used to specify a total of up to 12 words where a logical one at one bit position within the 12 words specifies a bit position for isolation testing.

Figure 2B:
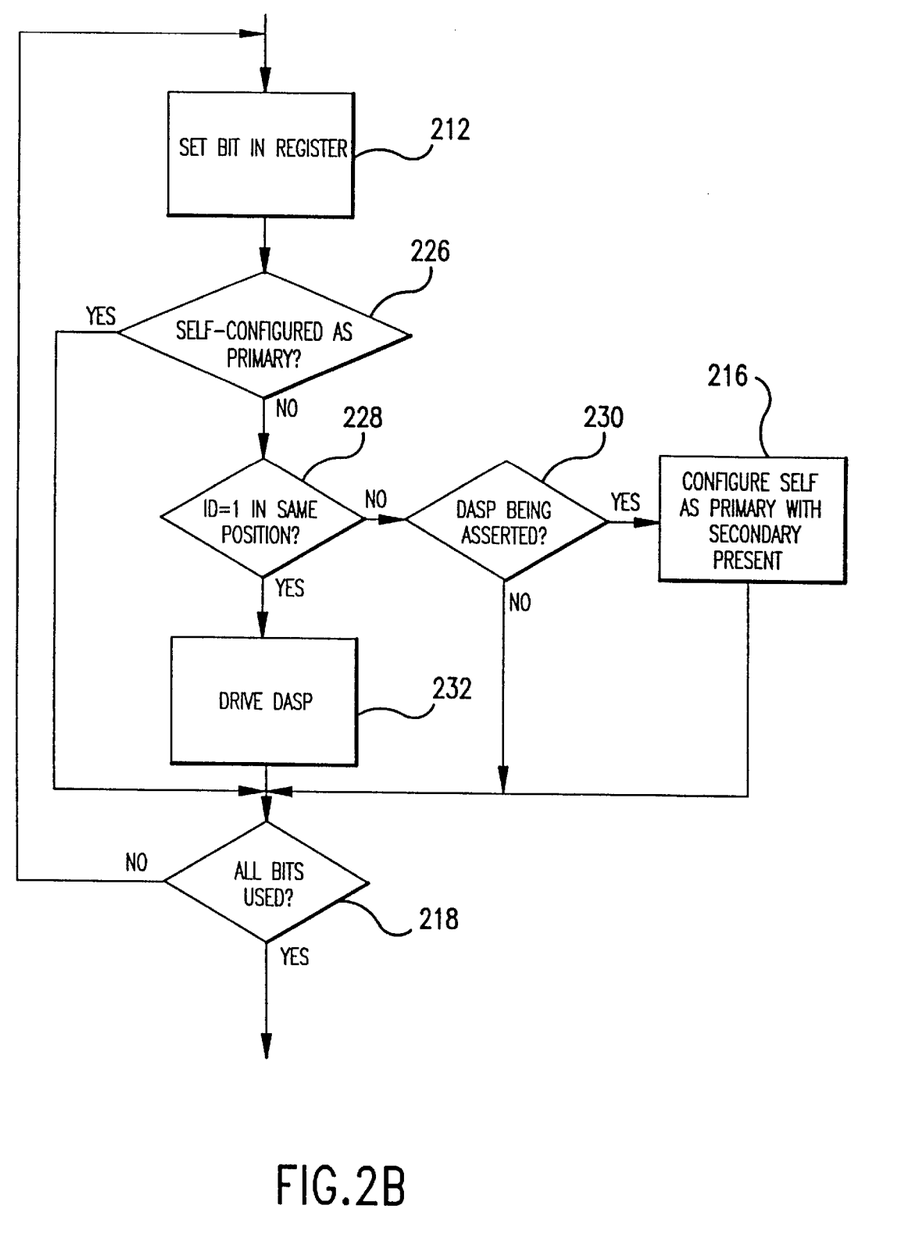
FIG. 2B is a flow chart showing additional detail for a portion of the flow chart of FIG. 2A.

Regardless of which technique is used to specify a bit position, at each bit position, an unconfigured jumperless device may determine that there is another unconfigured jumperless device present (test 214) (this is discussed in more detail in conjunction with FIG. 2B). If a first unconfigured jumperless device detects that a second unconfigured jumperless device is present, the first unconfigured jumperless device configures itself as a primary device with a secondary device present (step 216). When all bit positions have been tested (test 218), there is one unconfigured jumperless device, with 2 possible cases as follows:

1. There is one jumperless device, which is still unconfigured.

2. There are two jumperless devices, with one device still unconfigured and one device now configured as a primary device with a secondary device present.

The host computer then sends a command to a legacy primary device (step 220) as in steps 106 (FIG. 1) and 206. Note that if a device configured itself as a primary device in step 216, it is then effectively a legacy primary device and will now respond to commands to a legacy primary device. If a primary device is present, the host computer driver commands the unconfigured jumperless device to configure itself as a secondary device (step 222), as in steps 110 (FIG. 1) and 208. If there is no primary device present, there is only one jumperless device present, and the host computer commands that one jumperless device to configure itself as a primary device with no secondary device present (step 224).

FIG. 2B illustrates additional detail for decision 214 in FIG. 2A. Initially, all jumperless devices are unconfigured so the result of test 226 will be "No" the first time through the sequence. For each bit position, if the device has a logical one in the corresponding bit position (test 228) of its identification number, the device drives DASP in response (step 232). If at a bit position a first device has a logical zero in the corresponding bit position of its identification number, and another device is responding (test 230), the first device configures itself as a primary device with a secondary device present (step 216). Then for that first device, decision 226 will be "yes" for the remainder of the bit sequence. Regardless of the decision at step 226 the host computer continues through the rest of the bit positions (steps 212 and 218)

Consider the method of FIGS. 2A and 2B along with each of the four possible cases. Case 1, no other device present: no legacy device responds (decision 204). The host driver software asserts all the ID bit positions (steps 212 and 218) but the single jumperless device never detects another device so it remains unconfigured. No primary device responds to test 220, so the host computer driver commands the unconfigured device to configure itself as a primary device with no secondary device present (step 224). Case 2, legacy primary device present: upon detecting DASP at step 200, the legacy primary device configures itself as a primary device with a secondary device present, and then responds to the driver commands (decision 204) and the host driver software commands the jumperless device to configure itself as a secondary device (step 208). Case 3, legacy secondary device present: the legacy secondary device responds to the driver commands (decision 204) and the host driver software commands the jumperless device to configure itself as a primary device with a secondary device present (step 210). Case 4, jumperless device present: recall that case 4 applies only when 2 unconfigured jumperless devices are installed at the same time or when 2 jumperless devices are present for which configuration information is not stored in non-volatile memory. With two unconfigured jumperless devices, neither device will respond to the commands to legacy devices (decision 204). Depending on the identification number, one of the two jumperless devices will configure itself as a primary device with a secondary device present (step 216). That new primary device will then respond to the command of step 220, and the unconfigured device will be commanded to configure itself as a secondary device (step 222).

In FIGS. 2A and 2B, for some decisions, the sense chosen for illustration is arbitrary and the sense may be reversed. For example, at decision 206, the host driver software could test to see if a secondary device is present. Step 208 would then require the host to command the unconfigured device to configure itself as a primary device with a secondary device present and step 210 would then require the host to command the unconfigured device to configure itself as a primary device with no secondary device present. The choice of which configuration (primary or secondary) to make automatically in step 216 is arbitrary. That is, the sense of steps 216, 220 and 222 may be reversed. In step 216, the sense may be reversed so that the unconfigured device that is automatically configuring itself may configure itself to be a secondary device. After all bits have been used, there is still one unconfigured device. The sense of test 220 is then reversed to detect whether a secondary device is present. At step 222, the host would then command the unconfigured device to configure itself as a primary device with a secondary device present. Step 224 would remain unchanged.

Figure 3:
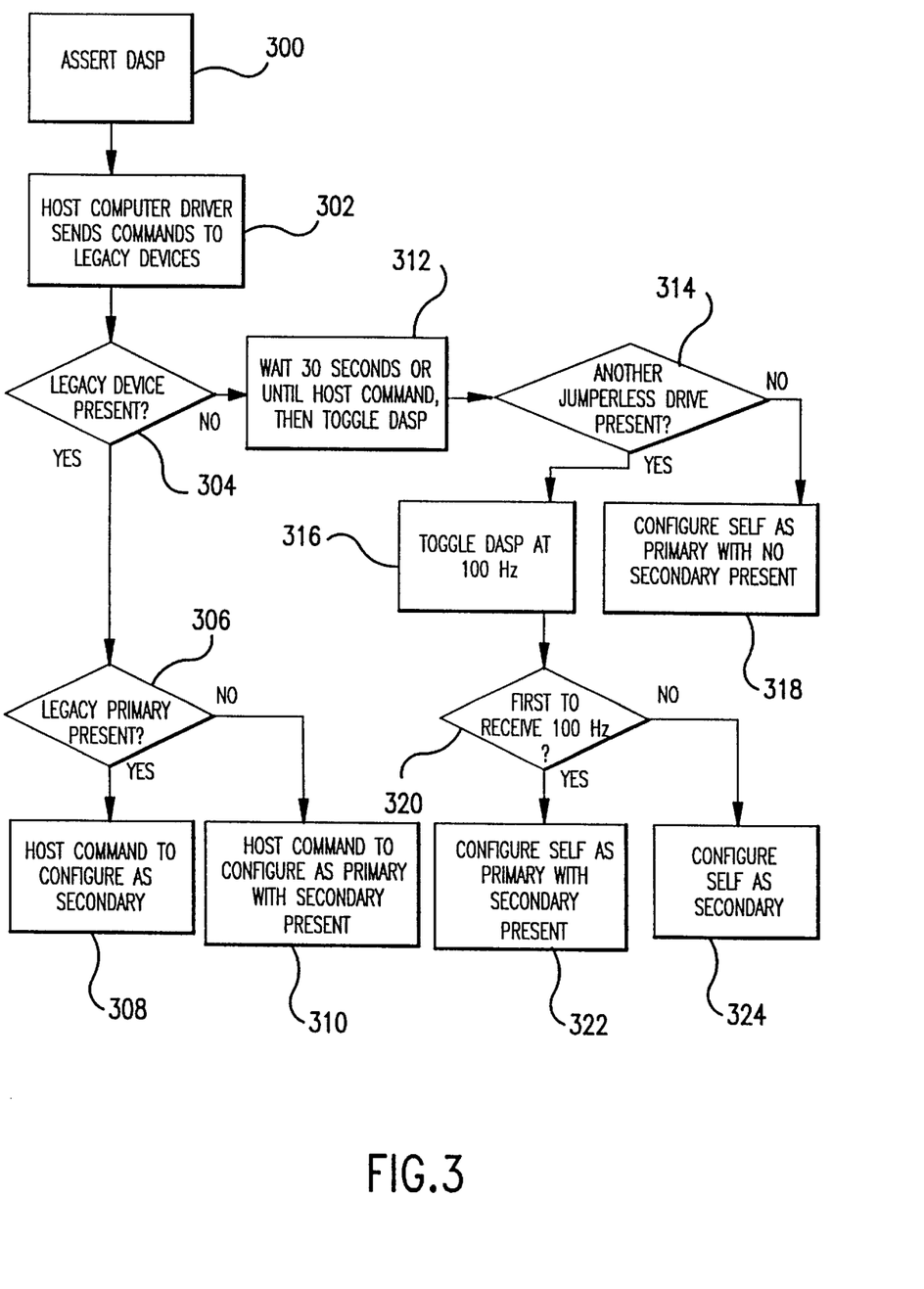
FIG. 3 is a flow chart of a method for autoconfiguration of a device in accordance with a third example embodiment of the invention.

FIG. 3 is a flow chart of an automatic configuration method to be followed in a third example embodiment of the invention. In FIG. 3, steps 300 through 310 are identical to FIG. 2A, steps 200 through 210 respectively. If no legacy device is present (decision 304) then the jumperless device first waits 30 seconds or until detecting a host command. Then, the unconfigured jumperless device waits an amount of time related to its ID, and then starts pulsing DASP (FIG. 3, step 312). In the following discussion, the particular numerical values are an example and may vary. Each device has an ID comprising an integral multiple of three decimal digits. For timing purposes, in the third embodiment, decimal digits in the serial number are logically grouped into groups of three digits, starting with the three most significant digits. For each group of three digits, for a 1 second period, each unconfigured jumperless device pulses DASP a total number of times equal to its three decimal digits, at 1000 pulses per second, with the series of pulses ending at the end of the 1 second period. For example, if the three decimal digits are 057, the device will remain inactive for 943 milliseconds (1000–57) and then pulse DASP 57 times at a rate of 1000 pulses per second. After the end of each period in which devices pulse according to part of the serial number, there is a 1 second wait period. After each wait period, each device starts another 1 second period for pulses corresponding to the next less significant group of three decimal digits, repeating with the wait periods until the serial number digits are exhausted. During the inactive part of each period in which the device pulses DASP at 1000 pulses per second (for example, 943 milliseconds in the previous example), the device monitors DASP for activity. If DASP is active for greater than 0.1 millisecond during the inactive period (decision 314), the device waits until the beginning of the 1 second wait period and then pulses DASP 10 times at 100 pulses per second (step 316). An unconfigured jumperless device that first sends 1000 pulses per second activity during another unconfigured jumperless device's inactive period (and then senses 100 pulses per second during the 1 second wait period) (decision 320) then configures itself as the primary device with a secondary device present (step 322). Optionally, during the 1 second wait period, the primary device may send 10 pulses at 100 pulses per second to the secondary device just to confirm the status. An unconfigured jumperless device that notices 1000 pulses per second activity during its inactive period configures itself as a secondary device (step 324). If after the serial number is exhausted, no activity was noticed during the inactive periods, the unconfigured jumperless device configures itself as a primary device with no secondary device present (step 318).

Consider the method of FIG. 3 along with each of the four possible cases. Case 1, no other device present: no devices respond to the commands to legacy devices (decision 304) and no other device pulses DASP during an inactive time (decision 314) so the jumperless device configures itself as a primary device with no secondary device present (step 318). Case 2, legacy primary device present: this is the same as case 2 for FIG. 2A. Case 3, legacy secondary device present: this is the same as case 3 for FIG. 2A. Case 4, jumperless device present: recall that case 4 applies only when 2 unconfigured jumperless devices are installed at the same time or when 2 jumperless devices are present for which configuration information is not stored in non-volatile memory. With two unconfigured jumperless devices, no devices respond to the commands to legacy devices (decision 304) and then, depending on device identification numbers, the first device to pulse DASP at 1000 pulses per second during the other device's inactive time configures itself as the primary device with a secondary device present (step 322) and the first device to notice DASP pulses at 1000 pulses per second during its inactive time configures itself as a secondary device (step 324).

As discussed for FIGS. 2A and 2B, FIG. 3 illustrates one arbitrary choice of alternatives and the sense of various steps in FIG. 3 may be reversed. In particular, the sense of step 306 may be reversed (with changes to steps 308 and 310 as discussed in conjunction with FIG. 2A) and steps 322 and 324 may be interchanged.

In each of the example embodiments, the complex case is case (4) where two unconfigured jumperless devices are installed at the same time or when 2 jumperless devices are present for which configuration information is not stored in non-volatile memory. Each example embodiment may be simplified substantially if devices are installed and configured one at a time. A first unconfigured device may be installed and the computer powered on for automatic configuration. Then the first device will automatically be configured as a primary device with no secondary device present. Then the second unconfigured device may be installed and the computer powered on a second time. Then the second device will automatically be configured as a secondary device. If case (4) is eliminated as a possibility, then the variable timing part of the first example embodiment (FIG. 1, step 100) can be eliminated. Likewise, if case (4) is eliminated as a possibility, the ID bit position protocol of the second example embodiment, (FIGS. 2A and 2B, steps 212–232) may be eliminated. If case (4) is eliminated as a possibility, pulsing related to device serial number (FIG. 3, steps 312–324) can be eliminated. Without case (4), none of the embodiments requires a device controller to be able to read a device identification number. However, configuration information must be stored in non-volatile memory.

In summary, each of the embodiments provides a method of automatic configuration without requiring that all devices meet a new standard. That is, in each embodiment, automatic configuration works with a mixture of legacy devices and new jumperless devices. For case (4), each embodiment provides a different method for determining which one of two jumperless devices becomes the primary device.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of automatically determining information for configuring a first unconfigured device electrically coupled to an adapter, the adapter electrically coupled to a computer, the method comprising the following steps:

(a) determining, by software in the computer, whether a configured device is electrically coupled to the adapter; and (b) determining, by the first unconfigured device, whether a second unconfigured device is electrically coupled to the adapter, when it is determined in step (a) that no configured device is electrically coupled to the adapter.

2. The method of claim 1, further comprising the following step:

(c) configuring the first unconfigured device, by the first unconfigured device, as a primary device with no secondary device present, when a second unconfigured device is not electrically coupled to the adapter.

3. The method of claim 1, further comprising the following step:

(c) configuring the first unconfigured device, by the first unconfigured device, as a primary device with a secondary device present, when a second unconfigured device is electrically coupled to the adapter.

4. The method of claim 1, further comprising the following step:

(c) configuring the first unconfigured device, by the first unconfigured device, as a secondary device, when a second unconfigured device is electrically coupled to the adapter.

* * * * *